US007347648B2

(12) United States Patent
Subbarayan et al.

(10) Patent No.: US 7,347,648 B2
(45) Date of Patent: Mar. 25, 2008

(54) LANDFILLS AND METHODS OF OPERATING A LANDFILL

(75) Inventors: Murugappan Subbarayan, Troy, MI (US); John Lawrence O'Keefe, Lexington, MI (US); Te-Yang Soong, Novi, MI (US); Jan M. O'Keefe, Lexington, MI (US)

(73) Assignee: Viridis Waste Control, LLC, Dublin, OH (US)

( * ) Notice: Subject to any disclaimer, the term of this patent is extended or adjusted under 35 U.S.C. 154(b) by 0 days.

(21) Appl. No.: 11/096,170

(22) Filed: Mar. 31, 2005

(65) Prior Publication Data

US 2006/0222463 A1   Oct. 5, 2006

(51) Int. Cl.
*B09B 1/00* (2006.01)
(52) U.S. Cl. .................................. 405/129.95
(58) Field of Classification Search ........... 405/129.95, 405/129.2
See application file for complete search history.

(56) References Cited

U.S. PATENT DOCUMENTS

| 5,201,609 | A | 4/1993 | Johnson |
| 5,857,807 | A | 1/1999 | Longo, Sr. |
| 6,283,676 | B1 | 9/2001 | Hater et al. |
| 6,364,572 | B1 * | 4/2002 | Hudgins et al. ....... 405/129.35 |
| 2003/0201226 | A1 * | 10/2003 | Kelly ......................... 210/609 |

OTHER PUBLICATIONS

Zhao, et al. "Enhanced Waste Decomposition in Bioreactor Landfill with Septage Additions" Geofrontiers Jan. 2005.*
Association of State and Territorial Solid Waste Management Officials—Special Waste Talk Force—Septage—Jun. 2000.
Operating Plan for the Landfill Bioreactor Project at the New River Regional Landfill—Mar. 23, 1999.
Waste Age—"Preparing Landfill Designs & Specifications" by Patrick Walsh and Philip O'Leary—Jul. 2002.
JWC Enviornmental—"Septage Receiving System"—2001.
Closure Plan Richmond Landfill—Prepared for Ecowaste Industries Ltd. by GNH Engineering—May 1999.
Michigan Department of Environmental Quality, Waste and Hazardous Materials Division—Checklist for Administrative Completeness Solid Waste Landfill Construction Permit Packet—Feb. 2003.
Design of Septic Tanks.
Minnesota Pollution Control Agency—Anoka Regional Sanitary Landfill: Update on Summer Construction—Jul. 5, 1999.
University of Missouri—Biosolids Glossary of Terms—Apr. 1995.
Chapter 4—Local Responsibilities.
Survey of Septage Treatment, Handling and Disposal Practices in California—California Wastewater Training and Research Center California State University, Chico—Dec. 17, 2002.
Water Quality—Biosolids Program Summary.
Florida Bioreactor Demonstration Project—What is a Bioreactor Landfill?
The Ohio State University Bulletin—Septage Management in Ohio—Bulletin 854.
Re-Use Potential from Septage Receival and Treatment Facilities Armidale by R.A. Patterson, T.M. Chapman and M. Porter—Oct. 1998.

* cited by examiner

*Primary Examiner*—John Kreck

(57) ABSTRACT

Landfills and their methods of operation are disclosed. Through the controlled introduction of septage into solid municipal waste, refuse decomposes faster to achieve additional landfill space. A business method of operating the landfill is also disclosed.

18 Claims, 6 Drawing Sheets

LANDFILLS AND METHODS OF OPERATING A LANDFILL

TECHNICAL FIELD

The present invention provides a method of reducing the volume of waste in a landfill to increase capacity and landfill gas generation, provide a beneficial use for septage waste and a business method for operating a landfill to achieve greater profitability.

BACKGROUND OF THE INVENTION

Landfill design, construction, and operation are some of the most highly regulated activities in the United States. These activities involve federal, state and local regulations, all of which deal with the environmental impact of the landfill and its operation. Even the closure of a landfill is subject to strict regulations. Numerous permits must be obtained at virtually all levels of government. These regulations include provisions relating to groundwater quality protection; landfill gas control; air pollution; surface water discharge; flood plains; safety issues; settlement, slope stability; and basic operating procedures. Boundary and topographic surveys, hydrogeological information (e.g., geological formation, soil texture, structure, bulk density, porosity, permeability, moisture, ion exchange characteristics; depth and type of bedrock; groundwater depth, hydraulic gradients, and seasonal fluctuations); climatological data such as wind direction and temperature and other variables must be evaluated, measured and documented during design, construction and operation of a landfill.

Typically, landfills are constructed in phases or "cells" that are distinct hydraulic units. In landfill operations, the cell presently receiving waste is called the "working face" or "active area" of the landfill. As refuse is received at the working face it is dumped, spread and compacted in layers called "lifts". Active areas are typically 200 ft×200 ft in size where a refuse compactor and/or a bulldozer are used to spread and compact refuse in lifts as it is dumped. The cell continues to be filled in lifts until it reaches capacity, at which time it is covered or capped. All landfills must have cohesive soil and/or synthetic liners at the bottom and along the sideslopes to isolate the refuse and contaminated liquid (or "leachate") from the surrounding soil. Landfill cells can be classified as either "wet cell" or "dry cell" depending on how leachate is managed in the cell.

Moisture, such as rainfall, that enters landfill cells percolates through the refuse and produces leachate which accumulates at the lowest point of the cell bottom. This leachate is typically pumped and disposed of at a wastewater treatment plant or at an in-house treatment system. In a dry cell, capping the landfill quickly with cohesive soil and/or synthetic barrier eliminates infiltration and ensures a relatively dry environment. The intent of operating dry cells is to minimize the amount of moisture entering the refuse mass and the subsequent amount of leachate formed.

Although wet cell landfills are known (as will be discussed more fully hereinafter), dry cells are more common. In dry cell landfills the deposited refuse dries and decomposes at extremely slow rates because moisture, an essential component of the decomposition process, is restricted. These dry cells are sometimes referred to as "Dry Tombs," since it is not unusual for them to contain waste materials that have decomposed little after fifty years or more. Without decomposition, the landfill cells fill more rapidly and must be closed before their potential capacity is reached.

Conventional wet cells are those in which leachate generated in the landfill is collected and reintroduced into a cell, wherein the leachate is absorbed by and continues to percolate through the waste. This so-called "leachate recirculation" operation promotes biological decomposition of refuse. This approach differs greatly from the approach of dry cell management of solid waste landfills where, as stated, biological decomposition of waste is intentionally inhibited, by restricting the moisture content of the cell. In wet cell landfills, there is no need to prevent moisture from entering the cell. As the waste decomposes, it further compacts or consolidates, hence allowing additional refuse to be deposited into the cell. When these wet cells are properly engineered and operated in a manner that maximizes decomposition and gas generation, they are sometimes referred to as "landfill bioreactors" or "bioreactor landfills".

Accordingly, it is evident that using landfill space efficiently and extending the site life to the extent possible, as well as recouping capital expenditure and operating the landfill profitably, are all desirable goals.

It is also known that septic systems separate the liquid of domestic sewage from solid and semi-solid materials by allowing these undissolved components to either settle to the bottom of a septic tank or float to the top while the liquid flows through a series of pipes that run to the soil absorption field (a.k.a. the "septic field"). Thus, septic tanks collect settled and floatable solids from the wastewater. The septic field then filters and treats the partially clarified septic tank liquid and distributes it through the soil. The septic tank also promotes biological breakdown of a portion of the solids.

Periodically, depending upon a number of factors such as tank size and frequency of use, the contents of the septic tank (septage) must be removed from the septic tank. This is achieved by pumping the septage from the septic tank into a truck which hauls the pumped septage away from the site. Many septage haulers are small, independent companies. They typically dispose of the septage either at waste water treatment facilities or at sites permitted for land application. Wastewater treatment plants usually charge the haulers significant fees for disposal. Meanwhile, land application is inexpensive but the practice poses certain public health risks and increased regulation. It would be desirable to provide an alternative, environmentally safe and cost effective disposal for septage which could reduce the hauler's disposal fees and public health concerns.

SUMMARY OF THE INVENTION

In one aspect, the present invention provides a method of accelerating the decomposition of waste in a waste disposal facility such as a landfill and provides a new use for septage. In the method, septage from septic tanks is added to a landfill cell in a controlled manner to provide moisture, pH-control, organic content and a host of microbes that foster biological decomposition of waste. Preferably, the septage is domestic grade septage such as that collected from septic tanks at residential households, schools, restaurants, motels and the like in non-urban communities. In another aspect, as leachate is formed by the percolation of liquid through the refuse it is recirculated back into the cell through the septage distribution system provided in the present invention. These wet cells act as bioreactors, with enhanced biological decomposition of landfill waste provided by the addition of the septage. By increasing the rate of decomposition, additional space is created in the cell. This additional space can then receive more waste, prolonging the life of the cell and thus of the entire landfill. Moreover, by accelerating waste decomposition in accordance with the teachings of the present invention, the waste becomes stabilized, thus serving to help in protecting groundwater, land and the atmosphere from contamination and/or pollution.

In the broadest aspect, the present invention provides a landfill containing refuse. The novel landfill has at least one wet cell. The wet cell has one or more septage distribution systems for controlled addition of septage to the refuse.

In another aspect, the present invention provides a business method for operating a solid waste landfill. In the method, septage haulers are preferably provided with an economic incentive (lower cost of disposal) to off-load septage at a landfill which utilizes the novel method of accelerating the decomposition of waste described herein. Most preferably, septage removal companies are required to agree that they will dispose of their septage to a site licensed to practice the novel waste decomposition method of the present invention.

This Summary of the Invention is not to be construed or interpreted as limiting the full scope of the invention as embodied in the patent claims.

DETAILED DESCRIPTION OF PREFERRED EMBODIMENTS OF THE INVENTION

Figure 1:
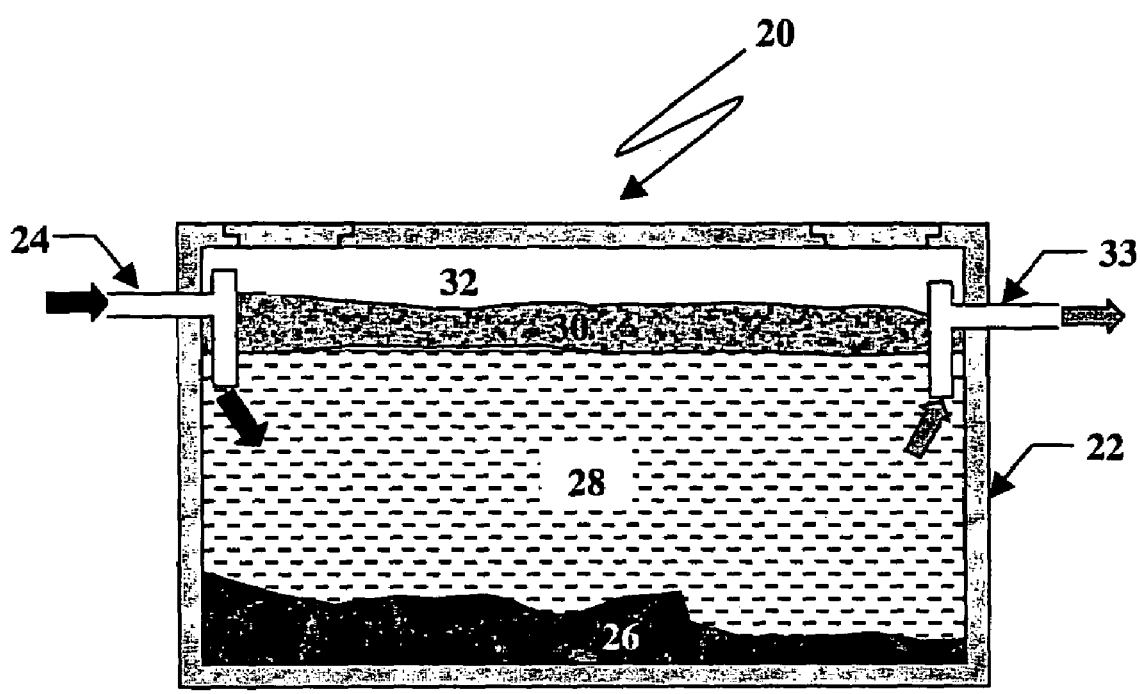
FIG. 1 is a diagrammatic cross-section of a septic tank.

Referring now to FIG. 1 of the drawings, septic tank 20 is shown having a tank body 22 and inlet 24 for receiving waste, preferably domestic sewage. As the content of sewage settles, it forms a solid/semi-solid fraction 26, a liquid effluent 28, a floatable layer fraction (or "scum") 30; a gas space 32 is also provided. As fraction 26 and fraction 30 separate, outlet 33 allows liquid effluent 28 to flow to a soil absorption field. When septic tank 20 is cleaned, fraction 26, effluent 28 and scum 30 are pumped into a tanker truck (not shown); the combined materials constitute septage. As used in the present invention, it is preferred that the septage (septage haulers usually have a mixture of septage from multiple septic tanks) has a pH that is desirable for biological decomposition of waste, but pH adjustment through the addition of acids or bases may also be necessary. Importantly, the septage is biologically active. In other words, it contains numerous microorganisms which, in the present invention, serve to decompose solid waste in the wet cells of the landfill.

Figure 2:
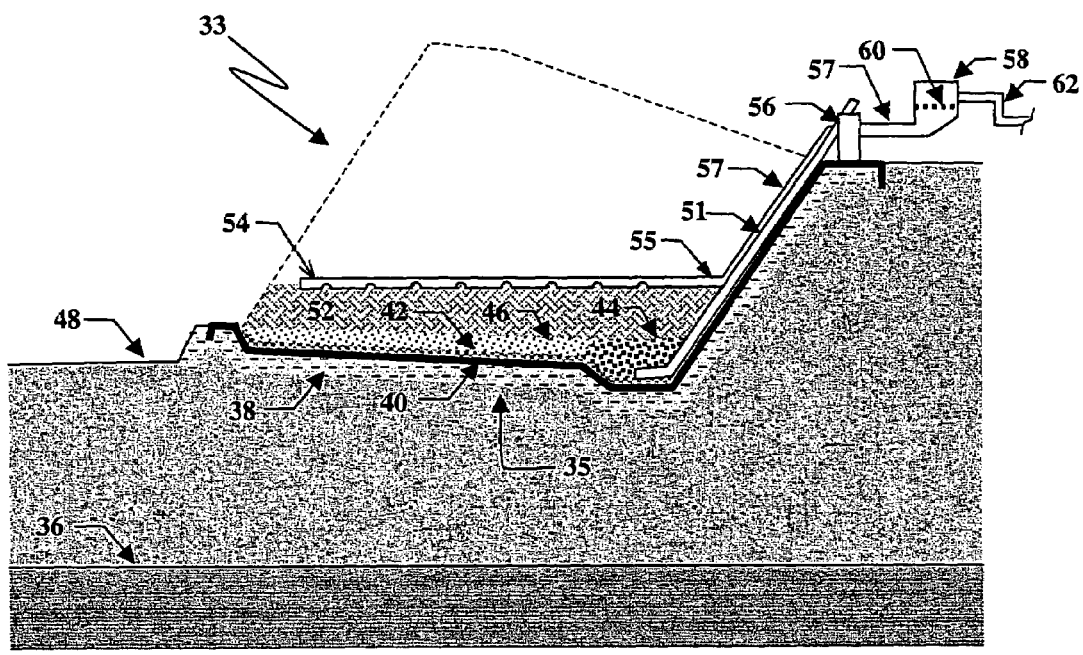
FIG. 2 is a diagrammatic elevational cross-section of a landfill wet cell made in accordance with the present invention.
Figure 5:
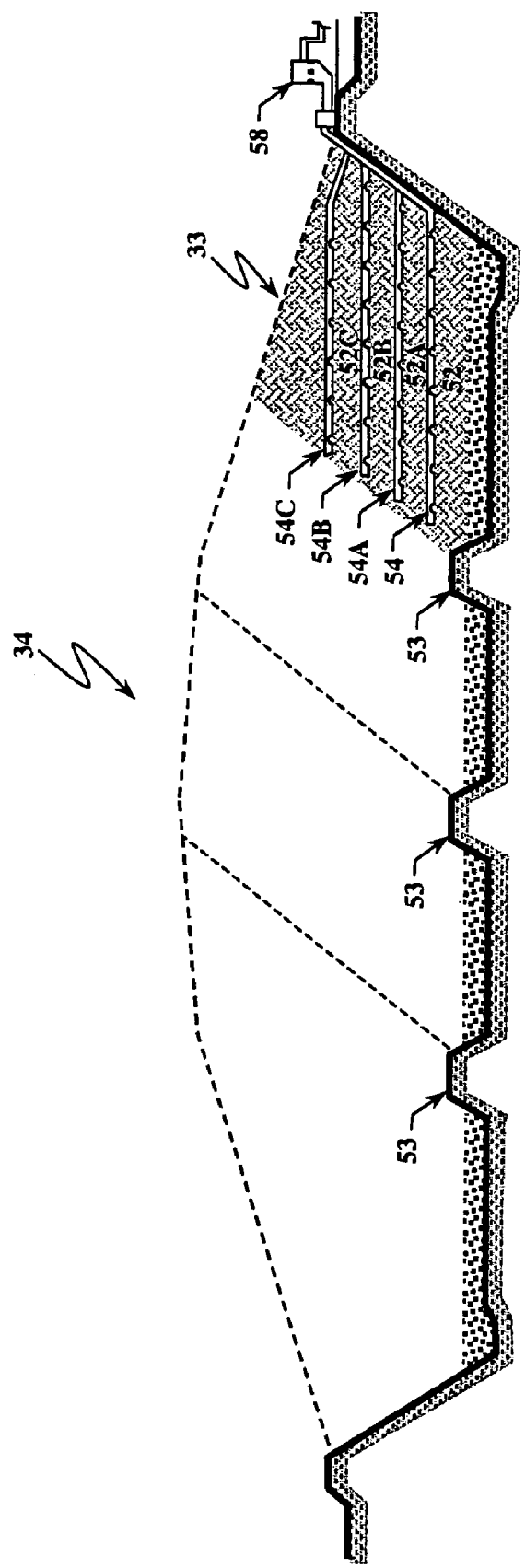
FIG. 5 is a diagrammatic elevational cross-section of a multi-cell landfill made in accordance with the present invention

Referring next to FIGS. 2 and 5 of the drawings, wet cell 33 of solid waste landfill 34 is shown diagrammatically in cross-section. Wet cell 33 has floor 35 and layer structures constructed above aquifer or ground water table 36, including compacted clay layer 38, synthetic liner (or "geomembrane") 40, an optional geotextile cushion layer 42 (which may be purchased from a number of suppliers), gravel layer 44 and drainage layer 46. The thickness, material type/grade, and other technical specifications of these materials will be dictated in part by federal, state and municipal regulations. Solely for exemplary purposes layer 38 may be from about 24 inches to about 36 inches thick, cohesive soil constructed in 6-inch compacted lifts, properly tested during construction. Synthetic liner 40 may be from about 1.5 millimeters to about 2.0 millimeters in thickness, composed of, for example, high-density polyethylene (HDPE), Polyvinyl Chloride (PVC) or other flexible polyolefin liners such as Flexible Polypropylene (FPP) and Very Flexible Polyethylene (VFPP). Gravel layer 44 can be, for example, aggregates with 2-inch typical particle size and fine particles preferably not exceeding about five percent by weight. Drainage layer 46 consists of sand or other porous material. Earth or ground 48 is shown defining cell or wet cell 33. It is to be understood that the aforementioned materials and even the layer structure (e.g., a multi-lined liner system for leak detection) per se can vary widely in practicing the present invention. Those skilled in the art will understand that liquid which percolates through refuse layer 52 is collected in drainage layer 46 and, by virtue of the grade, flows to gravel layer 44 which serves as a sump. This leachate can be collected through leachate collection pipe 51 through the use of a sump-pump (not shown) and added back into refuse 52 through septage distribution system 54.

Referring now specifically to cell 33, compacted refuse layer 52 is shown, having been compacted in the conventional manner. Typically waste layer 52 will consist of conventional municipal solid waste, from garbage trucks and the like. In order to evenly distribute the septage throughout refuse layer 52, and thus provide as much biological decomposition as possible, a liquid or septage distribution system 54, in this embodiment shown as a network of plastic pipes 55, is provided on top of layer 52. The inventors of the present invention have invented three separate configurations of septage distribution system 54 which are not deemed to be equivalents of one another. The first of these is described next: a network of pipes 55.

Figure 3:
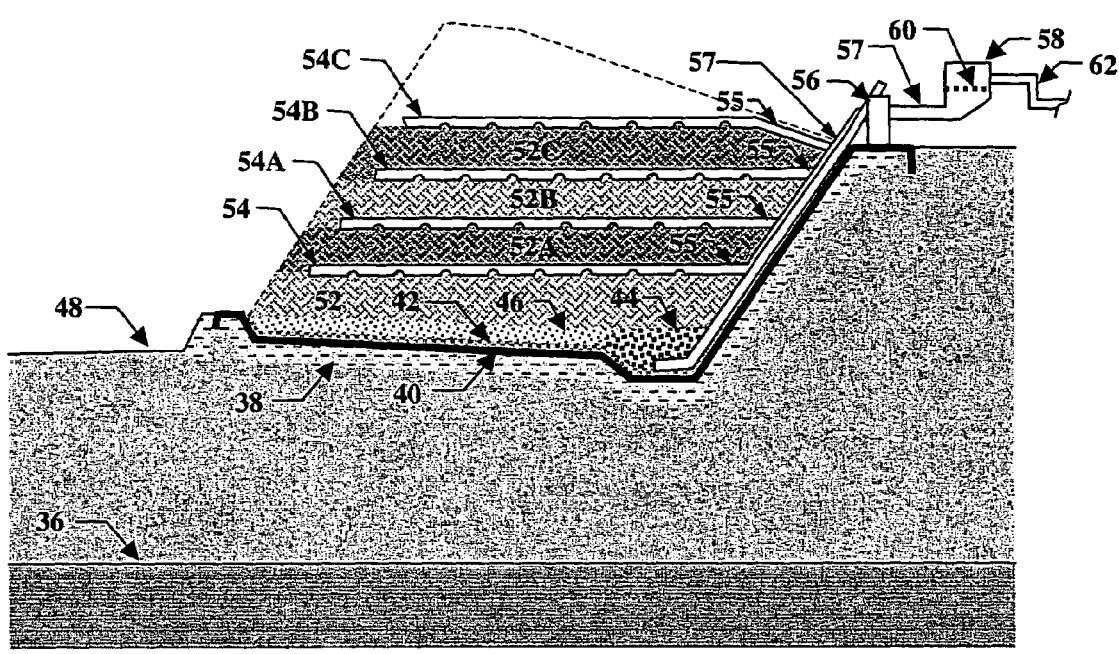
FIG. 3 is a diagrammatic elevational cross-section of a landfill wet cell made in accordance with the present invention at a later stage of development.

Septage distribution pipes 55 have an inner diameter of from about 2 inches to about 4 inches and may be made of any number of materials, but most preferred is high density polyethylene due to its somewhat flexible nature, superb chemical and biological resistance, and ease of heat welding to produce the desired layout. Other materials such as PVC pipe or drainage pipes that are made of other materials are possible alternatives to HDPE. Pipes 55 are connected to a septage distribution manifold 56 which in turn, in this embodiment, is attached to gravity-fed septage delivery conduit 57. While gravity feed of the septage is energy efficient, pumps can be used to transmit the septage more effectively and must be used as the layers of refuse 52 rise above ground level (best shown in FIG. 3). In some instances it may be possible to power these pumps and the sump pump with energy derived from landfill gases. Tube 57 can be formed of any of the materials described above for distribution pipes 55. Delivery tube 57 is attached to septage receiving hopper 58 having screen 60. Screen 60 serves to filter out relatively large solid objects which sometimes appear in septage such as plastic tampon containers and the like. Hose 62 delivers septage from a septage hauler (not shown) to hopper 58. As septage is deposited in hopper 58 it moves through delivery tube 57 and fills pipes 55. In FIG. 3 of the drawings (in which like parts have the same reference numbers), cell 33 is shown with four septage distribution pipe systems 54, 54A, 54B and 54C overlying one another and four refuse layers overlying one another, 52, 52A, 52B, and 52C. Septage distribution pipe systems 54, 54A, 54B and 54C may all be connected to manifold 56.

Figure 2A:
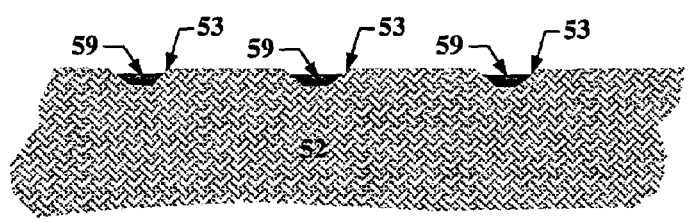
FIG. 2A is a partial cross-section of a refuse layer and a septage channel made in accordance of the present invention.
Figure 2B:
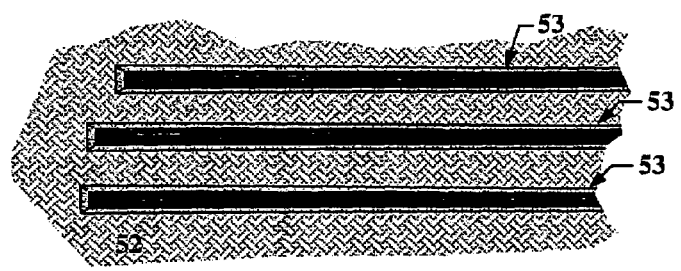
FIG. 2B is a plan view of FIG. 2A.

The second configuration of septage distribution system 54 is shown in FIGS. 2A and 2B. In this embodiment septage distribution system 54 has a plurality of channels or trenches 53 formed in refuse layer through the use of an excavator, a backhoe, or other such machine to create compaction channels 53. Channels 53 can vary in dimensions, but a channel 53 having a depth of from about 26 inches to about 48 inches and a width of from about 18 inches to about 36 inches is preferred. It will be understood that channels 53 serve to direct (controlled flow) the septage 59 across refuse layer 52. As septage leaves hopper 58 and flows through delivery tube 57, it enters channels 53 where it moves across refuse layer 52 and simultaneously begins to flow downwardly into layer 52. In this particular configuration, channels 53 become filled with the next deposit of a refuse layer when compacted.

In still another configuration of septage distribution system 54, flexible hoses (not shown) similar to fire hoses, but with holes or perforations similar to holes 64 (described hereinafter) are rolled out on the surface of layer 52 to achieve substantially even distribution of the septage. After the septage is deposited, the hoses are reeled in, a second layer of refuse 52 is deposited and compacted, and the hoses are reeled out again to deposit septage on the next layer. The common feature of these three configurations of septage distribution system 54 is that each provides controlled septage flow into refuse 52 from a plurality of predetermined high-concentration regions (i.e., pipes, channels or hoses) to substantially evenly distribute septage in layer 52.

Figure 4:
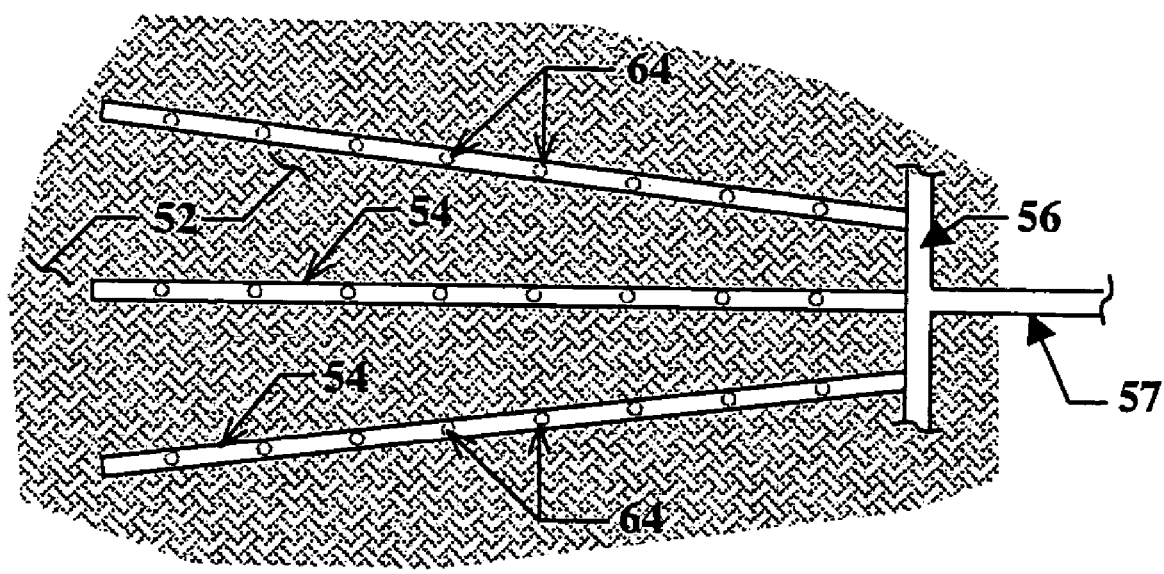
FIG. 4 is a partial view of one example of the septage distribution system as viewed from an underlying refuse layer.

A few pipes 55 of septage distribution system 54 are shown in FIG. 4 of the drawings having holes or openings 64 through which septage drains into refuse layer 52. Preferably, holes 64 face downwardly toward layer 52 (i.e. toward floor 35). The spacing and relative diameters of holes 64 can take a number of combinations; for example, in one embodiment a length of twenty feet may have holes beginning near manifold 56 of from about ¼ inch to about ½ inch in diameter and graduated spacing increasing from about 6 inches to about 12 inches between each hole 64. (Note that the drawings in this application are not to scale). It is preferred that the arrangement of holes and spacing be such that the septage be distributed relatively uniformly over refuse 52.

In one preferred embodiment, a processing unit (not shown) such as the "HONEY MONSTER" (JWC Environmental) can be used which processes septage for better flow through the hopper and septage distribution system 54. In one embodiment, the processing unit includes a flow meter which tracks the volume of septage flowing therethrough. The overall moisture content of cell 33 may vary. Preferred moisture or liquid content ranges from about 25 percent by weight to about 70 percent by weight and more preferably from about 40 to about 70 percent by weight of the contents of cell 33. Leachate collected in layer 46 and layer 44 is extracted through leachate collection pipe 51 and may be recirculated through refuse 52 by pumping it back to hopper 58 alone or with the simultaneous addition of septage. Referring now to FIG. 5 of the drawings, cell 50 is isolated from other cells by earthen bumps or intercellular berms 53. It will be understood that the level of leachate should be controlled so that it does not leak into an adjacent dry cell in a mixed use (wet cells and dry cells) landfill.

In a preferred embodiment of the present invention, septage distribution piping system 54 is also used to collect gasses, such as methane, generated by the decomposing refuse 52. Other conventional gas recovery apparatus may also be used for this purpose. By activating a vacuum pump (not shown), liquid distribution system 54 will collect the landfill gasses which can be run through a bypass (bypassing hopper 58) to a collection vessel. It may be preferable to first pressurize distribution system 54 to blow out substantially all of the septage before the gas collection step. The methane may be used to power equipment at the site, may be sold as gas or may be used to operate an onsite generator for production and sale of electricity.

Figure 6:
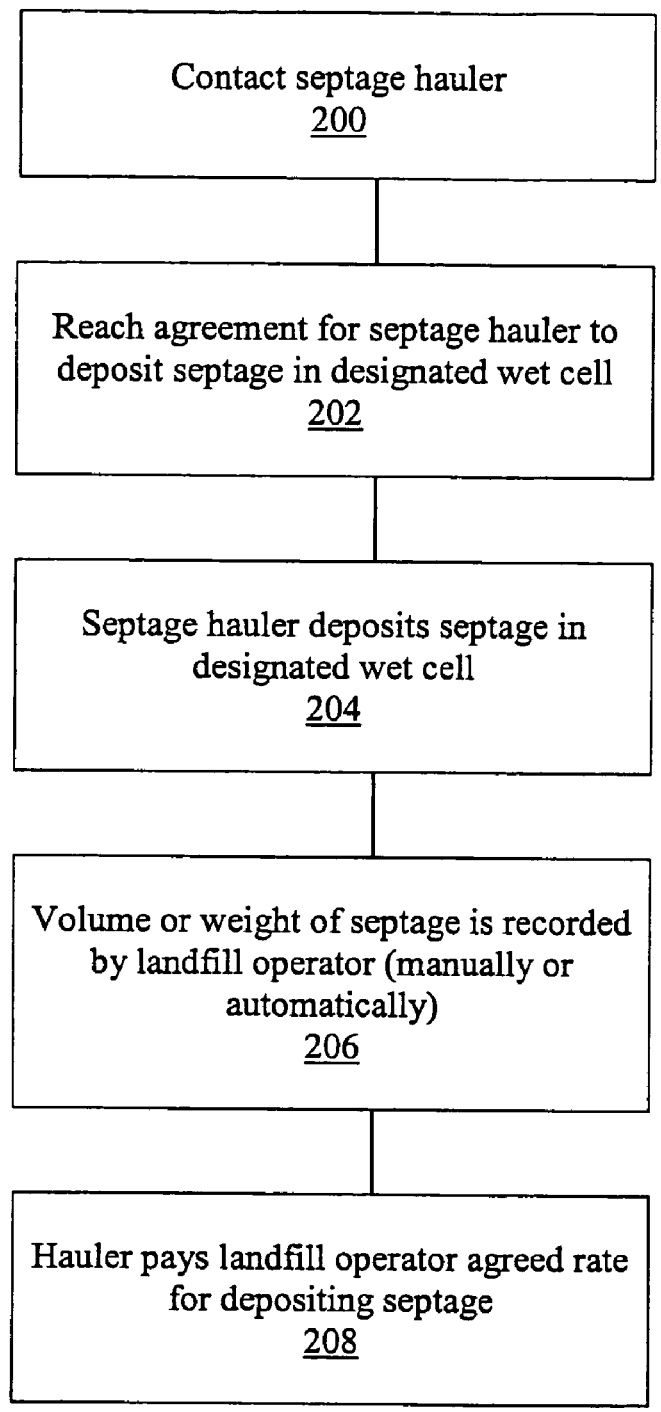
FIG. 6 is a block diagram flow chart illustrating an exemplary embodiment of the steps of the novel business method for operating a landfill in accordance with the present invention.

In still another aspect of the present invention, a method of doing business is provided. In one embodiment, the method includes the steps of entering into agreements with one or more septage hauler companies (or individuals) which require such septage haulers to deposit septage (preferably collected from the sources identified previously with respect to the landfill design and operation described above) in a designated landfill. Most preferably, the agreements with the septage haulers require that all of the haulers' septage be deposited in the designated landfill for a negotiated period of time. The designated landfill will have at least one section that is dedicated to wet cell decomposition through the addition of septage to the cell in the manner described in connection with the present invention as described above. In one embodiment, the amount charged to the septage hauler for depositing septage decreases as the volume of septage received from that septage hauler increases; in other words, in one embodiment, the agreement between the landfill operator and the septage hauler provides that once a hauler deposits a certain minimum volume or weight of septage to the landfill during a predetermined period (for example, one year), the price that the hauler pays for depositing additional septage in the landfill is reduced. In another embodiment, (with or without an exclusive dealing agreement), septage haulers are encouraged to deposit septage at a designated landfill having a wet cell configured or operated as set forth in the broadest claims of this patent by offering the haulers a monetary rebate if they offload a predetermined volume of septage within a specific period of time. Other such economic incentives may also be used. Thus, referring to FIG. 6 of the drawings, (by way of example only) in block 200 the landfill operator would contact a septage hauler. In block 202 the landfill operator and the septage hauler would reach an agreement whereby the septage hauler agrees to deposit all or at least a set minimum amount of septage at a designated landfill. The designated landfill will have a wet cell; the landfill or its operation is preferably covered by one or more claims of this patent or a patent which is a divisional of this patent. Next, as seen in block 204, the septage hauler deposits septage in the wet cell. In block 206, the volume or weight of septage deposited in the landfill by the hauler would be recorded (either manually or automatically), preferably by a flow meter (not shown) associated with hopper 58 or otherwise associated with landfill 34. In block 208, payment by the hauler would be made to the landfill operator.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A landfill containing refuse, comprising:
   at least one wet cell;
   a septage distribution system in said wet cell;
   said septage distribution system having defined spaces for temporarily holding septage in said refuse;
   a quantity of septage;
   said defined spaces being located to provide controlled flow of said septage into said refuse;
   said septage temporarily occupying said defined spaces.

2. The landfill recited in claim 1, wherein said septage distribution system is a plurality of plastic pipes.

3. The landfill recited in claim 1, wherein said septage distribution system comprises a network of trenches formed in said refuse for receiving said septage.

4. The landfill recited in claim 1, wherein said septage distribution system comprises a plurality of hoses which are temporarily disposed on said refuse.

5. The landfill recited in claim 2, wherein said plurality of pipes have a plurality of openings through which septage flows into said refuse.

6. The landfill recited in claim 5, wherein said landfill has an underlying aquifer and wherein said openings are substantially directed downwardly toward the wet cell floor.

7. The landfill recited in claim 5, wherein said pipes are intermittently substantially filled with landfill gas.

8. The landfill recited in claim 1, further comprising a leachate collection system in said wet cell.

9. A method of decomposing refuse in a landfill, said method comprising the steps of:
   providing at least one wet cell in said landfill;
   placing a layer of refuse at the bottom of said wet cell;
   providing a septage distribution system in association with said refuse;
   providing a source of septage; and
   adding said septage to said refuse via said septage distribution system.

10. The method of decomposing refuse in a landfill recited in claim 9, wherein said septage distribution system is a plurality of pipes, each of said pipes having a plurality of holes therein.

11. The method of decomposing refuse in a landfill recited in claim 9, wherein said septage distribution system is a plurality of trenches formed in the refuse.

12. The method of decomposing refuse in a landfill recited in claim 9, wherein said septage distribution system is a plurality of perforated hoses which are temporarily disposed on said refuse.

13. The method of decomposing refuse in a landfill recited in claim 10, wherein said layer of refuse is a first layer and further comprising placing a second layer of refuse on top of said septage distribution system and on top of said first layer of refuse.

14. The method of decomposing refuse in a landfill recited in claim 13, wherein said septage distribution system is a first septage distribution system and further comprising placing a second septage distribution system on top of said second layer of refuse.

15. The method of decomposing refuse in a landfill recited in claim 9, wherein said decomposing refuse generates gas and further comprising collecting said gas.

16. The method of decomposing refuse in a landfill recited in claim 15 wherein said gas is removed by drawing a vacuum through said septage distribution system.

17. The method of decomposing refuse in a landfill recited in claim 9, wherein leachate is collected from said landfill and added to said wet cell.

18. The method of decomposing refuse in a landfill recited in claim 9, wherein said wet cell reaches a moisture content of from about 25 percent by weight to about 70 percent by weight of the wet cell contents.

* * * * *